United States Patent [19]

Berz

[11] Patent Number: 4,634,838

[45] Date of Patent: Jan. 6, 1987

[54] ELECTRICALLY HEATED COFFEE PERCOLATOR

[75] Inventor: Hans-Peter Berz, Zurich, Switzerland

[73] Assignee: Intropa S.A., Panama, Panama

[21] Appl. No.: 609,723

[22] Filed: May 14, 1984

[30] Foreign Application Priority Data

Nov. 29, 1983 [EP] European Pat. Off. ........ 83109772.0

[51] Int. Cl.$^4$ ...................... H05B 1/00; A47J 31/057; A47J 31/56
[52] U.S. Cl. ...................................... 219/297; 99/281; 99/288; 99/304; 99/306; 99/307; 219/283; 219/302; 219/314; 222/146.5
[58] Field of Search ................... 219/297–299, 219/302–309, 314, 283; 99/305–307, 288, 304, 281, 279; 222/146.5

[56] References Cited

U.S. PATENT DOCUMENTS

| | | | |
|---|---|---|---|
| 2,568,474 | 9/1951 | Van Sciver | 222/146.5 X |
| 3,420,411 | 1/1969 | Ronchese | 219/306 X |
| 4,103,603 | 8/1978 | Bergmann et al. | 99/294 |

FOREIGN PATENT DOCUMENTS

| | | | |
|---|---|---|---|
| 2023590 | 11/1971 | Fed. Rep. of Germany | 219/297 |
| 2126617 | 12/1972 | Fed. Rep. of Germany | 99/307 |
| 2733487 | 2/1979 | Fed. Rep. of Germany | 99/279 |
| 2951866 | 2/1981 | Fed. Rep. of Germany | 99/288 |
| 1359143 | 7/1974 | United Kingdom | 99/304 |

Primary Examiner—A. Bartis
Attorney, Agent, or Firm—Darby & Darby

[57] ABSTRACT

An electric coffee percolator is provided with a fresh water container located above a water heating chamber sized to receive and retain about 30–60% of the volumetric amount of fresh water required for a complete coffee infusion. The heating chamber is separated by a common wall from the water container and receives fresh water therefrom through a non-return value located in the common wall. A ventilating pipe in the water container is slidably amounted in the common wall to project a selected distance into the heating chamber so that the water level in the heating chamber can be adjusted. A check valve in the ventilating tube prevents expulsion of water from the heating chamber into the water container. The bottom wall of the heating chamber is provided with an electric heating element surrounding a well from which a riser pipe through which the hot water is expelled extends upwardly to a water outlet chamber having a cross-sectional area which increase in size from its inlet end to its outlet end. The end of the riser disposed in the well is shaped to release steam pressure prior to the expulsion of the last bit of water remaining in the heating chamber to prevent the remainder of the water from being expelled at an excessive speed.

13 Claims, 7 Drawing Figures

ELECTRICALLY HEATED COFFEE PERCOLATOR

BACKGROUND OF THE INVENTION

The present invention relates to a coffee percolator of the type including a fresh water container, a heatable hot water chamber receiving water from said fresh water container through a non-return valve, and a riser pipe extending from said hot water chamber to a boiling water outlet.

Coffee percolators of the type most commonly encountered in the market include an electrically heated hot water or boiling chamber having a capacity of only a few cubic centimeters of water. This small amount of water is heated to its boiling point within the boiling chamber and then discharged therefrom to flow over the ground coffee contained in a filter cup. The preparation of a desired amount of coffee of for instance six to eight cups with a percolator of this type requires about fifty boiling-discharging-filling cycles of the hot water chamber, resulting in the hot water being supplied substantially continuously to the ground coffee over a period of about ten to twelve minutes.

Reduction of the percolation time is not practicable with a percolator of this type, because the hot water chamber employed therein would become overheated if the power supplied thereto were to exceed bout 500 to 600 watts. Owing mainly to the long percolation time, but also as a result of several additional factors, the ground coffee is very strongly leached, resulting in the coffee beverage containing acrimonious substances and acids. One of the additional factors is that, over the entire percolation period, sufficiently hot heated water generally reaches only the central area of the ground coffee, while the border areas cool rather rapidly. Also, the heated water in this type of percolator reaches the ground coffee at a temperature of less than bout 85° C. For all these reasons, many coffee connoisseurs prefer hand-brewed coffee and consider machine-brewed coffee stale and of insufficiently developed aroma.

It is therefore an object of the present invention to provide a coffee percolator with the aid of which it is possible to prepare a coffee beverage of improved flavor characteristics.

In contrast to the known coffee percolators referred to above, a percolator according to the invention has a hot water chamber of substantially increased volume, about 30 to 60% of the volume of the water needed for a full infusion. As a result, the heated water is supplied to the ground coffee in the form of only two or three relatively large-volume charges, so that the entire volume of the ground coffee is infused at a higher temperature than in the case of the above discussed known percolators. This enables the entire percolation process to be accomplished within a short overall percolation time of about 2.5 to 4 minutes, resulting in the coffee beverage containing a maximum of aromatic substances and only a small proportion of flavor-impairing and other extraction substances. A further advantage of this coffee percolator resides in the fact that it does not produce the disagreeable gurgling noises common to percolators having a small-volume hot water chamber, and that its tendency to become calcified is considerably reduced.

In a preferred embodiment, the hot water chamber is provided immediately below a fresh water container and a common wall between them defines a bottom wall for the fresh water container. In this bottom wall, there is slidably mounted a ventilation pipe which extends downwardly into the hot water chamber. This permits the amount of water entering the hot water chamber to be varied. This also permits the number of boiling-discharging-filling cycles performed by the percolator to be varied. In the case, for instance, of an eight-cup percolator, this feature permits a smaller volume of coffee of, for instance, six cups to be prepare without varying the number of the operating cycles. This feature additionally permits the overall percolation time to be varied, although only to a limited degree. The ventilation pipe also includes a check valve for preventing the expulsion of water from the hot water chamber into the fresh water container.

Before entering into a discussion of the preferred embodiments, it may be helpful to consider several specific aspects of the present percolator. As the amount of water discharged from the hot water chamber in one operating cycle is relatively great, it is preferred to take specific precautions against the infusion water entering the filter cup at an excessive speed. The relatively high power input to a coffee percolator of this type (in the case of an eight-cup percolator, for instance about 1100 watts) results in a high steam pressure, which causes the infusion water evaporating in the hot water chamber to contain a relatively great proportion of steam upon discharge. In the absence of any precautions, the danger exists that the infusion water will splash out of the filter cup or that the ground coffee will be pushed up excessively along the walls of the filter. The invention contemplates various features which may be employed by themselves or in any combination for countering these dangers.

In accordance with another aspect of the invention, steam pressure generated in the hot water chamber is counteracted by releasing steam prior to expulsion of the last bit of water remaining in the hot water chamber, and this steam mixes with the water flowing through the riser pipe. This is effective to prevent the remainder of the water from being expelled at an excessive speed. This steam release permits a relatively high heating input to be applied so as to accomplish the entire percolation process in a short time. Embodiments are disclosed in which steam release is achieved by providing an elongated slot or a series of spaced holes near the inlet end of the riser pipe, by cutting the inlet end of the riser pipe obliquely, and by providing branch pipes of different lengths at the inlet end of the riser pipe.

Although a steam outlet opening of increasing size already results in a considerable improvement, the best results are achieved with a steam outlet opening of continuously increasing size.

Further objects and advantages of the invention will become more clearly evident from the following description of exemplary embodiments with reference to the accompanying drawings, wherein.

Figure 1:
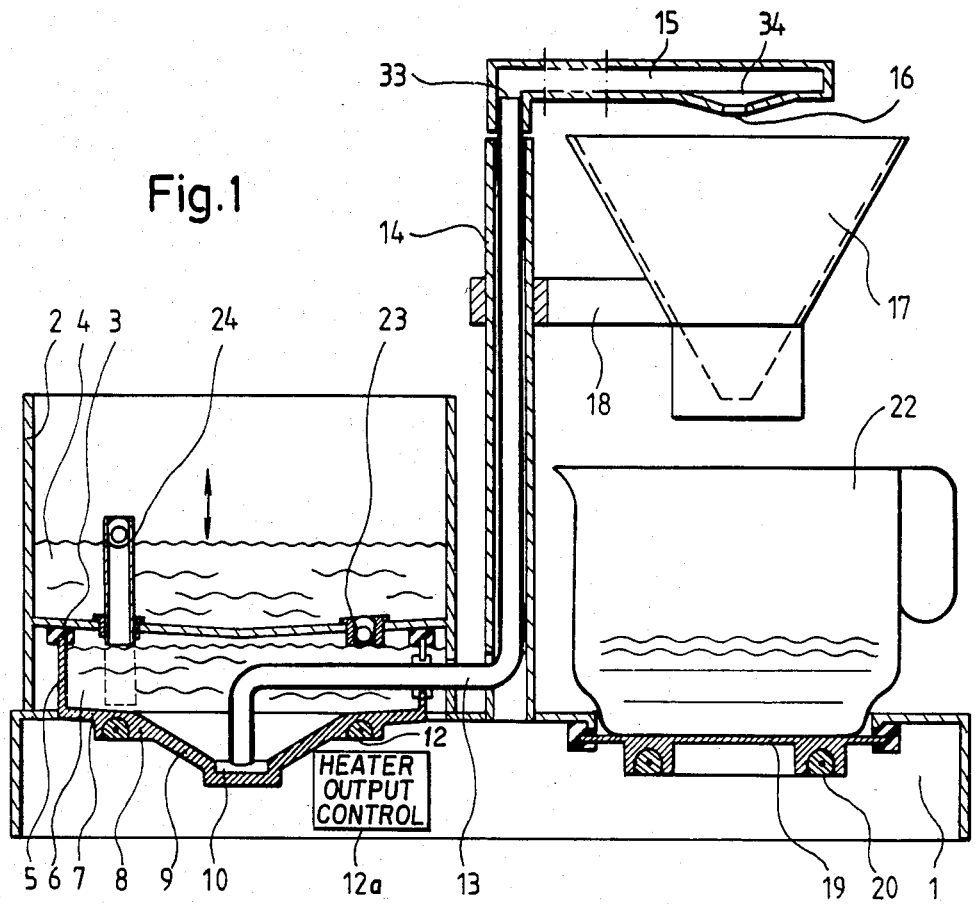
FIG. 1 shows a cross-sectional view of an embodiment of a coffee percolator according to the invention, taken along the line I—I in FIG. 2.
Figure 2:
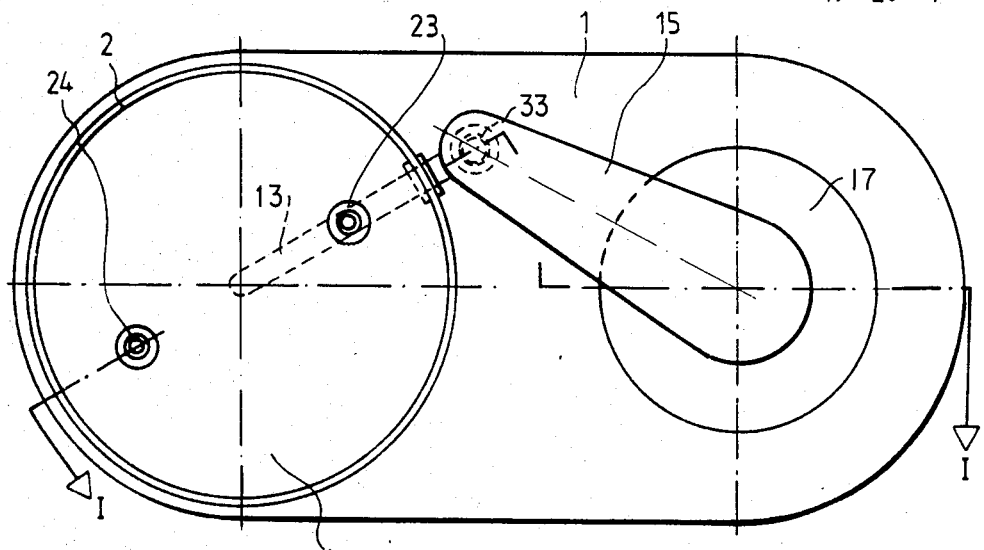
FIG. 2 shows a top plan view of the coffee percolator showing in FIG. 1.

The coffee percolator shown in the drawings has a base 1 with a hollow cylindrical vessel 2 supported thereon, said vessel 2 having a horizontally extending bottom wall 3 at about one third of its height from below. The portion of vessel 2 above bottom wall 3 serves as a fresh water container 4. The portion below bottom wall 3 has the shape of a kettle 5 sealingly connected to bottom wall 3 so as to define a boiling or hot water chamber 6 therewith. A bottom portion 7 of kettle 5 is formed with a horizontally extending outer rim 8 surrounding a downwardly directed, funnel-shaped inner portion 9 forming a well 10 at its center. Disposed in horizontal rim portion 8 of bottom portion 7 is an electric heater element 12. Extending into well 10 is the end of a riser pipe 13. From well 10, riser pipe 13 extends vertically over a short distance to a horizontally bent section passing through the outer wall of kettle 5 in sealing engagement therewith. Outside of kettle 5 riser pipe 13 extends again vertically upwards. Mechanical support and heat insulation of riser pipe 13 is provided by a surrounding tubular shell 14 secured to base 1. The upper end of riser pipe 13 extends a short distance beyond that of shell 14 and is connected to a pivotable outlet chamber 15, to be described in detail. Disposed below an outlet opening 16 of outlet chamber 15 is a filter cup 17, pivotally connected to shell 14 by a horizontal arm 18. Below filter cup 17, a hot plate 19 is embedded in base 1, said hot plate 19 being also provided with an electric heater element 20. Hot plate 19 is provided within a recess in the base so that a coffee brewing pot 22 placed thereon is retained against movement with respect to the hot plate, while being heated thereby.

Bottom wall 3 is a common wall between fresh water container 4 and hot water chamber 6 and is provided with a water supply valve 23 and an air escape valve or ventilating valve 24, the latter consisting of a pipe section carrying a valve body at its upper end and being slidably mounted in bottom wall 3 for sealing arrangement. The purpose of this slidable mounting will be explained below The electric circuits associated with the two heater elements 12 and 20, including a thermostat connected to the rim portion 8 of bottom portion 7, are of conventional type and need therefore not be described in detail.

Preferably, the output of heater 12 is adjusted by a heater output control 12A with the amount of coffee to be prepared in such a manner that the percolation time is kept constant at 3 to 4 minutes regardless of the amount of coffee prepared. This feature makes it possible, for instance, to reduce the eight-cup-capacity of a percolator to a four-cup-capacity by merely varying the heat input. If, for instance, an eight-cup percolator were operated at a very high heat input, a reduction of the amount of fresh water fed to the hot water chamber 6 could result in the infusion cycle being inadmissibly speeded up. This may be readily avoided by decreasing the heat input so as to again achieve the desired infusion time of about three to four minutes.

The above described coffee percolator operates as follows: The upwardly opening fresh water container 4 is filled with an amount of fresh water corresponding to the amount of coffee to be made, for instance eight cups. In the case of an eight-cup-percolator, the volume of hot water chamber 6 is dimensioned so as to permit about four cups of water to be received therein. The water filled into fresh water chamber 4 flows through supply valve 23 into the still empty hot water chamber 6, displacing the air contained therein through ventilation valve 24. Hot water chamber 6 is thus filled to the level of the lower end of the tubular ventilation valve 24. Energization of heater element 12 causes the water contained in hot water chamber 6 to be heated to its boiling point, resulting in the formation of steam. The resulting pressure increase in hot water chamber 6 causes valves 23 and 24 to close, whereupon the boiling water is expelled through riser pipe 13 into outlet chamber 15 to flow through outlet opening 16 into filter cup 17. As soon as the formation of steam in hot water chamber 6 stops, the interior pressure drops agains, permitting further fresh water to flow through supply valve 23 into hot water chamber 6, whereupon the described cycle is repeated.

The vertically slidable ventilation valve 24 permits the volume of water flowing into hot water chamber 6 to be varied, as hot water chamber 6 will always be filled only to the level of the lower end of valve 24. For preparing only four cups of coffee, for instance, with an eight-cup percolator, ventilation valve 24 is pushed downwards to a level at which hot water chamber 6 is filled with only two cups of water, so that also in this case the coffee infusion process is accomplished in two cycles. It is assumed that a conventional bag filter will run dry about two minutes after having been filled with infusion water to about two thirds of its height. Under this assumption, heater element 12 is dimensioned such that the second fresh water charge reaches its boiling point after about two minutes, so that the second infusion takes place when the bag filter has just run dry or is not yet quite empty. The entire percolating process is thus accomplished within about four minutes.

If after the second infusion the fresh water container 4 still contains a residual amount of water, there will be a third infusion following the second infusion much more quickly than the second infusion follows the first one, as the amount of water to be heated is smaller. If only six cups of coffee are to be made with an eight-cup percolator, the second three-phase infusion cycle is carried out after a correspondingly shorter time, so that the overall percolating time will be about two and a half to three minutes in this case. In an eight-cup percolator a heater element having a power input of 1100 watts is considered sufficient.

As the above-described coffee percolator has a hot water chamber 6 having a relatively great volume in combination with a relatively powerful heater 12, a rapid pressure increase takes place in hot water chamber 6 after the water contained therein has reached its boiling point, resulting in hot water chamber 6 being emptied at a very fast rate. To prevent the infusion water from entering filter cup 17 at an excessive pressure, particular precautions have been provided as described in detail below.

Hot water chamber 6 has a bottom portion 7 formed with a funnel-shaped inner section 9 forming a central well 10. Into well 10 extends the end of riser pipe 13. Heater element 12 is disposed between funnel-shaped section 9 and horizontal rim 8 of bottom portion 7. By means of this arrangement it is possible to considerably reduce or even completely stop the steam formation within hot water chamber 6 while there is still some infusion water in the lower part of hot water chamber 6. This results in the last residue of the infustion water being expelled, if at all, at a reduced pressure. It is particularly this last residue of the infusion water, however, that is potentially problematic, since it is intermixed with steam in the absence of suitable precautions, resulting in its being expelled at a relatively fast rate.

An alternative or additional provision for solving the described problem assures that the steam pressure is reduced relatively early, prior to the expulsion of the last residue of the heated water from hot water chamber 6. For this purpose, the end of riser pipe 13 which extends into hot water chamber 6 may be formed in such a manner that it provides an opening for the escape of the steam contained in hot water chamber 6 above the water level, the size of which opening increases in response to the lowering of the water level. However, since steam pressure is required to move water up the riser pipe, the size of the opening must be kept sufficiently small and must increase in size sufficiently slowly with a drop in water level to assure that enough steam pressure remains for this purpose. Embodiments of an arrangement of this kind are depicted in FIGS. 3a to 3d.

Figure 3A:
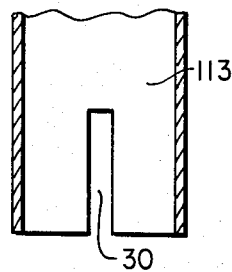
FIGS. 3a to 3d show various embodiments of the end of the riser pipe.

In the embodiment of FIG. 3a, the end of riser pipe 113 is formed with a vertical slot 30 extending to a suitably determined height, so that about the last one-third of the water contained in hot water chamber 6 may be expelled therefrom together with an increasing proportion of steam. It is also possible to provide a plurality of such slots parallel to one another and, optionally, of varying lengths. In this case, the slot or slots must be sufficiently narrow to avoid rapid or excessive drops in pressure as the water level drops.

Figure 3B:
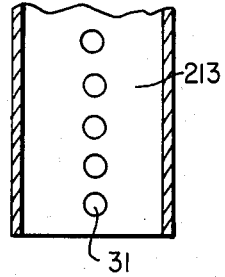

In the embodiment of FIG. 3b, the end of riser pipe 13 is formed with a plurality of openings 31 disposed one above the other. This arrangement is also effective to ensure that the remainder of the infusion water contained in hot water chamber 6 is expelled therefrom intermixed with steam, so that an excessive increase of the steam pressure is avoided. It may be advantageous to form the individual openings 31 with varying cross-sectional areas, with the diameter of the lower openings being greater than those of the upper openings. In this case, the holes must be sufficiently small so that uncovering any one of them, as a result of a water level drop, will not reduce steam pressure excessively or too rapidly.

Figure 3C:
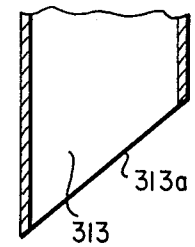
Figure 3D:
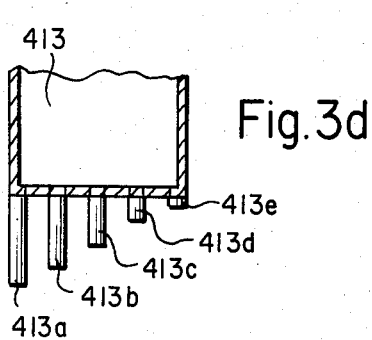

In the embodiment of FIG. 3c, the end 313a of riser pipe 313 is cut off at an angle of about 45° in a manner similar to an injection syringe, resulting in the formation of a steam escape opening the size of which increases in response to the lowering of the water level. As a further possibility (FIG. 3d) for reducing the steam pressure, the end of riser pipe 413 may be divided into several downwardly extending branch pipes 413a, 413b, 413c, 413d and 413e, each having its own inlet opening with the inlet openings being at different heights.

The embodiments of FIGS. 3a–3d may be applied by themselves or in any combination.

As an alternative or additional provision for achieving a substantially continuous flow of the infusion water, the distal end of riser pipe 13 may be provided with an outlet chamber 15 specifically designed so that its cross-sectional area increases steadily from its inlet opening 33 to its outlet opening 16. This increase of the cross-sectional area also results in a reduction of the flow velocity of the infusion water exiting from riser pipe 13. The outlet chamber 15 has the further effect that at least a part of the steam exiting together with the infusion water is condensed, resulting in a further reduction of the flow velocity. As shown in FIG. 1, outlet opening 16 is disposed in a well 34, which avoids infusion water accumulation within outlet chamber 15, without the same exiting therefrom. At the same time this water flows into the filter cup with a minimum amount of residue and heat loss.

The provisions set forth in the preceding paragraph are effective to cause the surge of infusion water exiting from the riser pipe to flow into the filter cup in a uniform manner and at low pressure. Steam pulses occurring during this process are dampened by the outlet chamber, which is effective to accumulate erratically inflowing amounts of water and to dispense such water at a continuous flow. A further possible effect of the outlet chamber may be seen in the fact that steam bubbles are caused to condense therein, whereby the flow speed of the expelled water is additionally reduced. Preferably, the cross-sectional area of chamber 15 at the outlet end is at least ten times the cross-sectional area of riser pipe 13.

Figure 4:
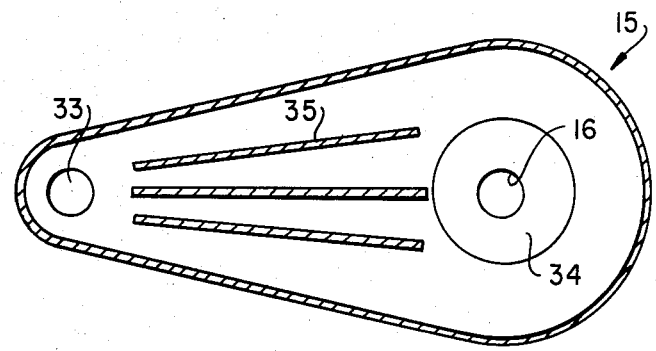
FIG. 4 shows a specific embodiment of the outlet chamber.

A preferred embodiment of an outlet chamber 15 is shown in FIG. 4, wherein vertical ribs 35 extend substantially from inlet opening 33 to outlet opening 16 are provided for directing the water entering outlet chamber 15 from riser pipe 13 towards outlet opening 16, distributing it in a substantially uniform flow pattern.

Although preferred forms of the invention have been disclosed for illustrative purposes, those skilled in the art will appreciate that many additions, modifications and substitutions are possible, without departing from the scope and spirit of the invention as defined by the accompanying claims.

What is claimed is:

1. In an electrically heated coffee percolator of the type including a fresh water container, a heatable hot water chamber receiving water from said fresh water container through a non-return valve, and a riser pipe extending from said hot water chamber to a boiling water outlet, the improvement comprising said hot water chamber having a sufficient volumetric capacity to receive, through said nonreturn valve, and retain about 30 to 60% of the volumetric amount of fresh water required for a complete coffee infusion, said fresh water container being disposed immediately above said hot water chamber and a fresh water container bottom wall having said non-return valve located therein separating said hot water chamber from said fresh water container and serving as a common wall therebetween.

2. A coffee percolator according to claim 1, further comprising said riser pipe extending upwardly from a near end disposed in said hot water chamber, steam outlet opening means associated with said riser pipe and disposed at said near end and controlled by the water level in said hot water chamber for increasing the size of a steam outlet opening as the water level in the hot water chamber decreases, to prevent ejection of hot water with an excessive velocity due to steam pressure build-up.

3. A coffee percolator according to claim 2, wherein said steam outlet opening means comprises at least one steam outlet opening shaped and positioned to be progressively uncovered as the water level decreases.

4. A coffee percolator according to claim 3, wherein said steam outlet opening means comprises at least one of:
a longitudinal slot along said riser pipe;
a plurality of openings located one above the other on said riser pipe;
an obliquely cut end portion of the riser pipe and;

a plurality of branch pipes projecting below said riser pipe and ending at different heights therebelow.

5. A coffee percolator according to claim 2, wherein said steam outlet opening means comprises at least one of:
   a longitudinal slot along said riser pipe;
   a plurality of openings located one above the other on said riser pipe;
   an obliquely cut end portion of the riser pipe and;
   a plurality of branch pipes projecting below said riser pipe and ending at different heights therebelow.

6. A coffee percolator according to claim 1, wherein the end of said riser pipe remote from said hot water chamber opens into an outlet chamber having spaced inlet and outlet ends, the cross-sectional area of said outlet chamber measured perpendicular to a line connecting said ends at a point proximate said outlet opening being at least ten times the crosss-sectional area of said riser pipe.

7. A coffee percolator according to claim 6, wherein the outlet chamber is constructed so that its cross-sectional area increases in size from said inlet end to said outlet end.

8. A coffee percolator according to claim 6, wherein the interior or said outlet chamber is formed with ribs each extending substantially from said inlet end to said outlet end.

9. A coffee percolator according to claim 6, wherein said outlet end includes an opening formed at the lowermost point of a well in the bottom portion of said outlet chamber.

10. A coffee percolator according to claim 1, wherein said hot water chamber includes a bottom portion having a well-shaped configuration, said riser pipe having a near end located adjacent the lowermost point of said well.

11. A coffee percolator according to claim 10, further comprising heater means disposed in the bottom portion of said hot water chamber at a location spaced from the lower portion of said well.

12. A coffee percolator according to claim 1, further comprising means for adjusting the heat output of said heater means in accordance with the amount of coffee to be prepared, in such a manner that the percolation time may be kept constant at about 3 to 4 minutes, irrespective of the amount of coffee to be prepared.

13. In an electrically heated coffee percolator of the type including a fresh water container having a bottom wall, a heatable hot water chamber disposed below said water container and receiving water from said fresh water container through a non-return valve, and a riser pipe extending from said hot water chamber to a boiling water outlet, the improvement comprising said hot water chamber having a sufficient volumetric capacity to receive, through said non-return valve, and retain about 30 to 60% of the volumetric amount of fresh water required for a complete coffee infusion, a ventilating pipe slidably mounted in the bottom wall of said fresh water container so as to project downwardly into said hot water chamber, the extent of the downward projection of said ventilating pipe into said hot water chamber being thereby selectively adjustable, said ventilating pipe including a check valve for preventing the expulsion of water from said hot water chamber through said ventilating pipe, whereby the level to which said chamber is filled is controlled.

* * * * *